United States Patent

[11] 3,607,101

| | | | |
|---|---|---|---|
| [72] | Inventor | Linden Wayne Cochran<br>Basking Ridge, N.J. | |
| [21] | Appl. No. | 788,289 | |
| [22] | Filed | Dec. 31, 1968 | |
| [45] | Patented | Sept. 21, 1971 | |
| [73] | Assignee | Multi-Minerals Limited<br>Toronto, Ontario, Canada | |

[54] COMBINED TANK REACTOR ASSEMBLY
2 Claims, 2 Drawing Figs.

[52] U.S. Cl........................................................ 23/260,
23/273 R, 23/285
[51] Int. Cl........................................................ B01d 9/02
[50] Field of Search............................................ 23/273,
260, 259.2, 285, 165

[56] References Cited
UNITED STATES PATENTS

| | | | |
|---|---|---|---|
| 1,099,177 | 6/1914 | Howard.................. | 23/285 X |
| 2,024,680 | 12/1935 | Curtis..................... | 23/285 |
| 2,043,103 | 6/1936 | Kester..................... | 23/260 UX |
| 2,245,130 | 6/1941 | Guillissen................ | 23/285 UX |
| 2,443,765 | 6/1948 | Francis.................... | 23/260 UX |
| 2,520,957 | 9/1950 | Peterson.................. | 23/283 X |
| 2,549,565 | 4/1951 | Benner.................... | 23/285 X |
| 3,023,089 | 2/1962 | Graves..................... | 23/259.2 |
| 3,181,931 | 5/1965 | Weber...................... | 23/165 |
| 3,416,889 | 12/1968 | Caldwell................... | 23/165 |

*Primary Examiner*—Joseph Scovronek
*Assistant Examiner*—D. G. Millman
*Attorney*—Norman N. Holland

ABSTRACT: A combined tank reactor and crystallizer assembly which comprises a small reactor section and a large crystallizer section. The reactor section has means to heat and agitate the reaction medium to provide optimum conditions for the reaction to proceed. Underflow passage means between the two sections enables products from the reactor section to flow into the crystallizer section.

PATENTED SEP 21 1971 3,607,101
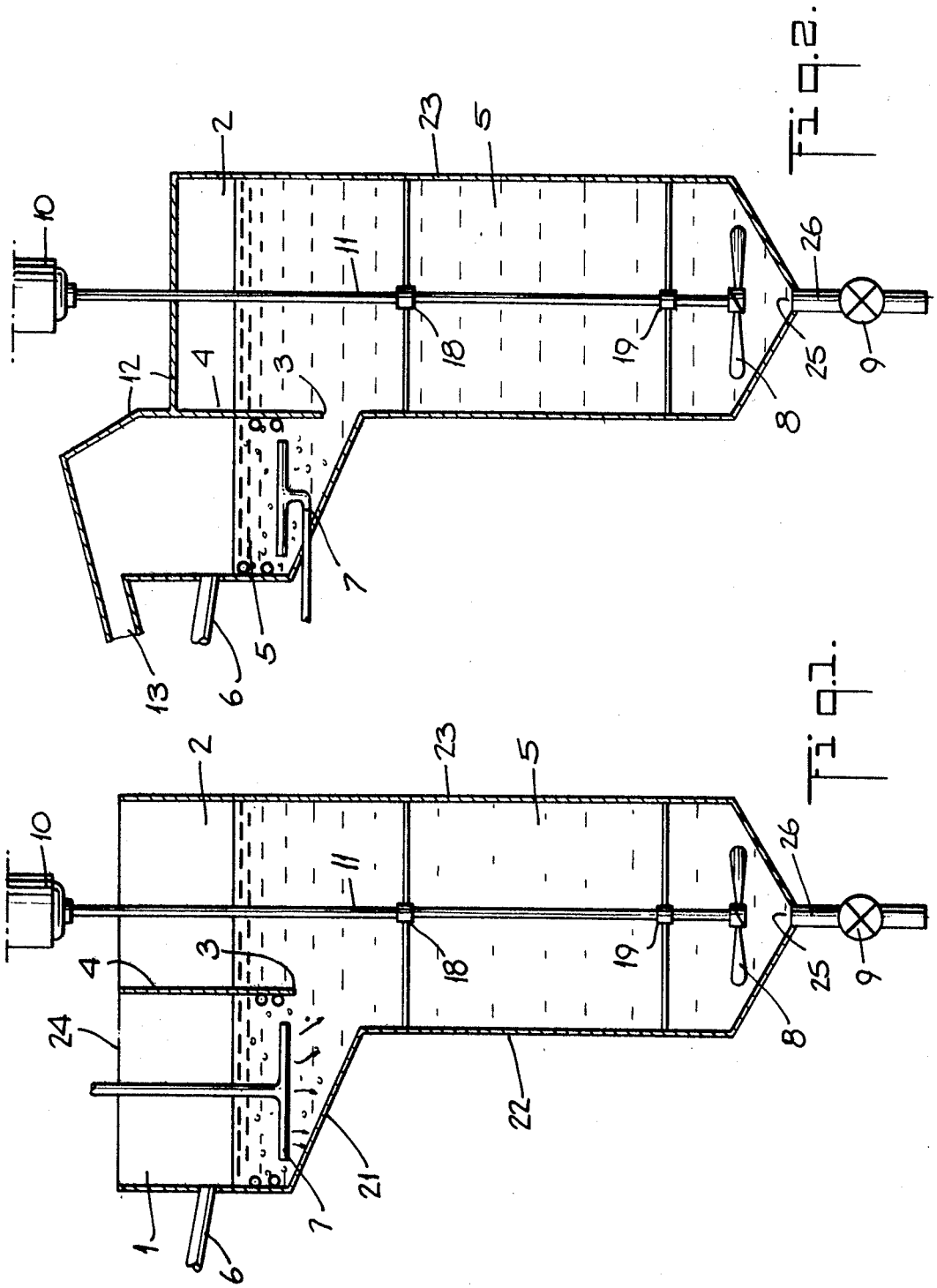
INVENTOR.
LINDEN WAYNE COCHRAN
BY
ATTORNEY

COMBINED TANK REACTOR ASSEMBLY

DESCRIPTION

The present reactor assembly will be described in connection with the production of phosphoric acid by the acidic digestion of phosphate material. It is to be understood, however, that the mechanism herein disclosed covers a reactor-crystallizer design which may be used for other reactions which occur in solution at elevated temperatures and which yield a product which is to be crystallized from solution.

In applicant's preferred process for the production of phosphoric acid (as disclosed in copending U.S. Ser. No. 386,764, now U.S. Pat. No. 3,494,735, and related applications) the reaction of phosphate raw material, such as apatite, with acid, such as phosphoric acid, takes place at temperatures of between 85° C. and 105° C. In order to insure removal of volatile fluorine contaminants, the reaction medium is sparged with a gaseous stream, preferably moist heated air. During the reaction, monocalcium orthophosphate salt is produced and is crystallized from solution. The crystals are then removed and contacted with a resin to form phosphoric acid.

The present invention represents an improved tank design for carrying out this reaction, as well as other reactions, which occur in solution at elevated temperatures and which yield a product which is later crystallized. Use of a combined reactor assembly comprising a small reactor section, approximately 10 percent the size of conventional tanks, which is located adjacent a large crystallizer section in such a manner so as to allow the reaction products to quickly and directly flow from the reactor secton to the crystallizer section results in distinct advantages over existing reactor designs.

Use of a smaller reactor unit allows a relatively larger volume of air to be passed quickly through the reaction zone so as to aid in the removal of volatile contaminants. The smaller area also insures greater heat savings since a correspondingly smaller amount of reactant materials need be heated to bring the entire reaction medium to the desired temperature. It is also easier to provide the smaller reaction area with a negative pressure sufficient to aid in removing fluorine contaminants from the reaction zone when a small reaction unit is used.

Placing the smaller unit in a combined tank assembly along with a larger crystallizer unit and providing passage means between the two insures a purer product since the products can flow into the crystallizer unit without coming into contact with contaminant slimes which may be floating on top of the solution in the reactor unit.

It is an object of this invention to provide an improved combined reaction-crystallizer tank assembly which allows a relatively large volume of air to be passed through the reaction zone.

It is a further object of this invention to provide a combined reactor-crystallizer tank assembly in which a lower amount of heat is needed to bring the reaction zone to he desired reaction temperature.

It is a further object of this invention to provide a combined reactor-crystallizer tank assembly that aids in the removal of organic slimes from the products by having underflow passage means connecting the reactor unit and the crystallizer unit.

It is another object of this invention to provide a combined reaction-crystallizer tank assembly in which a negative pressure may be more easily provided to aid in the volatilization of contaminants.

These and other objects not specifically referred to herein will become obvious to one skilled in the art upon examination of the specification or appended claims or upon use of the invention in practice.

A preferred embodiment of the invention has been chosen for purposes of illustration and description and is shown in the accompanying drawings, forming a part of the specification wherein:

FIG. 1 is a sectional view of the improved combined tank design of the present invention; and FIG. 2 is a sectional view of an alternative embodiment of the present invention wherein provision is made for subjecting the reaction environment to a slight negative pressure.

FIG. 1 shows the basic combined reactor-crystallizer tank assembly design. A smaller reactor 1 unit is mounted adjacent to a larger crystallizer and surge unit 2. The bottom wall 21 of the reactor unit 1 merges with sidewall 22 of the crystallizer unit to form the combined tank design.

A wall member 4 separates the two units 1 and 2 from one another except for the passage means 3 which are situated at the bottom of wall 4 below the level of solution 5. This design provides a reactor unit 1 of relatively small area which allows the reaction to proceed with greater economy of operation. The passage means 3 allow reactants to be carried from the reactor unit 1 into the crystallizer unit 2 without coming into contact with contaminating slimes which may be floating on the surface of solution 5.

Reactants, such as phosphate-bearing materials and phosphoric acid, are added to reactor unit 1 through inlet means 6. If desired additional inlet means may be provided to separately introduce each reactant. The reaction zone may be maintained at elevated temperatures and a pipe member 7 can be inserted into the solution 5 contained in reactor unit 1 for introduction of a sparging stream of gas. Such as gas-sparging stream aids in the removal of volatile contaminants from the reaction zone through the open top 24 of reactor 1.

As a product, such as monocalcium orthophosphate, is produced it flows through passage means 3 into the larger and cooler crystallization unit 2 in which crystallization of the salt takes place. The underflow passage means 3 allow the products to pass from reactor unit 1 to crystallizer unit 2 without coming into contact with floating slimes. Such slimes are commonly found in phosphate-containing raw materials, such as apatite, and pose a problem. The use of the reaction assembly disclosed herein materially reduces this risk of contamination.

Once the crystallization of the salt has occurred in crystallizer unit 2, the crystallized product and solution 5 can be removed in the form of a slurry through outlet 25 by opening valve means 9 in pipe 26. The slurry can then be passed to suitable filtration apparatus (not shown) for further processing.

If desired a stirrer assembly can be provided in crystallizer unit 2 to insure that the crystallized salt does not clog outlet means 25. The blade member 8 of the stirrer assembly can be placed in close proximity to outlet 25 at the end of drive shaft 11. A motor 10 provides the power to turn shaft 11 and blade 8. Brackets 18 and 19 through which shaft 11 passes are connected to walls 22 and 23 to fixedly hold the stirrer assembly in crystallizer unit 2.

As the product slurry is removed, the level of the solution 5 can be maintained constant by a equal input of fresh solid and liquid reactant through inlet means 6 in reactor unit 1.

FIG. 2 shows a modified design which is essentially the same as the basic assembly described in connection with FIG. 1. The tank assembly in FIG. 2 provides for the inclusion of a top 12 which seals off reactor unit 1 and crystallizer unit 2 from the atmosphere. Passage 13 leads to a vacuum pump (not shown) which when activated applies a slight negative pressure to reaction medium contained in reactor tank 1. In applicant's process for the production of phosphoric acid, this slight vacuum materially aids in the volatilization and removal of fluorine contaminants, such as hydrogen fluoride, through passage 13.

As changes may be made in the construction and arrangement of the parts herein without departing from the spirit and scope of the invention and without sacrificing any of the advantages, it is to be understood that all matter herein is to be interpreted as illustrative and not in a limiting sense.

I claim:

1. A combined unitary reactor assembly comprising an outer wall, a reactor section and a crystallizer section within said outer wall, said reactor section being smaller than said crystallizer section, said two sections being separated by a common wall member, passage means in said wall member to allow solutions to flow from the reactor section to the crystallizer section, said passage means being located in the lower portion of said wall at a level which is below the level of any solution in said reactor and crystallizer sections, gas-sparging means in said reactor section, outlet means at the lower end of said crystallizer section to permit products to be removed from said reactor assembly, and stirrer means in said crystallizer section adjacent said outlet means.

2. An apparatus as claimed in claim 1 in which the reactor unit is sealed off from the atmosphere and wherein means are provided to apply a vacuum to he reactor unit.